US006945049B2

(12) United States Patent

Madsen

(10) Patent No.: US 6,945,049 B2
(45) Date of Patent: Sep. 20, 2005

(54) REGASIFICATION SYSTEM AND METHOD

(75) Inventor: Per Helge Madsen, Tranby (NO)

(73) Assignee: Hamworthy KSE a.s., Tranby (NO)

( * ) Notice: Subject to any disclaimer, the term of this patent is extended or adjusted under 35 U.S.C. 154(b) by 65 days.

(21) Appl. No.: 10/264,712

(22) Filed: Oct. 4, 2002

(65) Prior Publication Data

US 2004/0065085 A1 Apr. 8, 2004

(51) Int. Cl.[7] .................................................. F03G 7/04
(52) U.S. Cl. ...................................... 60/641.7; 60/641.1
(58) Field of Search ............................ 60/641.1, 641.6, 60/641.7

(56) References Cited

U.S. PATENT DOCUMENTS

| | | | | |
|---|---|---|---|---|
| 3,986,340 A | * | 10/1976 | Bivins, Jr. | 62/50.2 |
| 6,089,022 A | | 7/2000 | Zednik et al. | |
| 6,367,429 B2 | | 4/2002 | Iwasaki et al. | |
| 6,598,408 B1 | * | 7/2003 | Nierenberg | 62/53.2 |
| 6,644,041 B1 | * | 11/2003 | Eyermann | 62/50.2 |

* cited by examiner

*Primary Examiner*—Hoang Nguyen
(74) *Attorney, Agent, or Firm*—Abelman, Frayne & Schwab

(57) ABSTRACT

The present invention provides a novel regasification method and system in which the evaporative coolant is forced through an evaporation and condensation cycle, allowing control of the evaporative coolant condensation pressure; thus yielding a more flexible and more compact regasification system than those of the prior art.

22 Claims, 4 Drawing Sheets

REGASIFICATION SYSTEM AND METHOD

BACKGROUND OF THE INVENTION

1. Field of the Invention

This invention relates to the field of regasification systems, and more specifically to a method and system for regasification of liquid natural gas (LNG), intended for installation on a seagoing vessels.

2. Description of the Related Art

Natural gas exists in subterranean reservoirs throughout the world. This gas (i.e. methane) is a valuable commodity, and various methods and equipment exist for the extraction, treatment and transportation of this natural gas from its reservoir to the consumer. The simplest transportation means is a pipeline for conveying the gas in its gaseous state from the reservoir to the consumer. In many instances, however, the reservoirs are located in remote areas and/or areas with restricted accessibility, such that laying a pipeline is either technically very complicated and/or economically unprofitable. One very common technique for transporting natural gas from such areas, is to liquefy the natural gas at or near the extraction site, and transport this liquefied natural gas (LNG) to the market in specially designed storage tanks, often placed aboard a sea-going vessel.

The process of liquefying the natural gas involves compression and cooling of the gas to cryogenic temperatures (e.g. −160° C.). The LNG carrier may thus transport a significant amount of liquefied gas to its destination. At this destination, the LNG is offloaded to special tanks onshore, before it is either transported by road or rail on LNG carrying vehicles or revaporized and transported by e.g. pipelines.

It is, however, in many instances more advantageous to revaporize the natural gas aboard the seagoing carrier before the gas is off-loaded into onshore pipelines. U.S. Pat. No. 6,089,022 (Zednik et al.) discloses such a system and method for regasifying LNG aboard a carrier vessel before the re-vaporized natural gas is transferred to shore. The LNG is flowed through one or more vaporizers positioned aboard the vessel. Seawater taken from the body of water surrounding the carrier vessel is flowed through a vaporizer to heat and vaporize the LNG back into natural gas before this natural gas is offloaded to onshore facilities.

Zednik et al. furthermore cites the "TRI-EX" Intermediate Fluid-type LNG vaporizer as one vaporizer type capable of using seawater as the principal heat exchange medium. Such type of vaporizer is disclosed in U.S. Pat. No. 6,367,429 (assigned to Kabushiki Kaisha Kobe Seiko Sho) and comprises in principle a housing with a pre-heat section and a final heating section. The pre-heat section has a plurality of pipes running through it which fluidly connect two manifolds which lie at either end of the pre-heat section, while the final heating section has also a plurality of pipes running through it which fluidly connect two other manifolds at either end of the final heating section. Seawater, which is collected directly from the sea surrounding the vessel, is pumped into a manifold and flows through the pipes in the final heating section and into the manifold before flowing through the pipes in the pre-heat section and into the manifold, from which the seawater is discharged back into the sea.

In operation, the LNG flows from a booster pump and into a looped circuit which is positioned within the pre-heat section of the vaporizer, which in turn contains a "permanent" bath of an evaporative coolant (e.g. propane) in the lower portion. The seawater, flowing through the pipes, will "heat" the propane in the bath, causing the propane to evaporate and rise within the precooling section. As the propane gas contacts the looped circuit, it gives up heat to the extremely cold LNG flowing through the circuit and recondenses to fall back into the bath, thereby providing a continuous, circulating "heating" cycle of the propane within the pre-heat section.

Problem to be Solved by the Invention

While the present regasification systems, like the one cited above, work well under given conditions, their use and applicability are nonetheless restricted by certain limitations and disadvantages. It is for example not possible to control the condensation pressure in the known systems. Furthermore, the evaporative coolant (e.g. propane) is in the known systems allowed to evaporate and condense in an unrestrained fashion; the heat transfer process is thus relatively slow and—in order to achieve optimum system efficiencies—large volumes are required. This often leads to the regasification systems being very large and requiring a great portion of valuable deck space.

It is therefore a long felt need for a regasification system which allows the condensation pressure to be more easily controlled, and a system which is more compact and flexible in operation than known regasification systems.

Means for Solving the Problem

The present invention solves that need by providing a novel regasification method and system in which, when in operation, the evaporative coolant is forced through an evaporation and condensation cycle; and allowing control of the evaporative coolant condensation pressure; thus yielding a more flexible and more compact regasification system than those of the prior art.

BRIEF SUMMARY OF CERTAIN INVENTIVE ASPECTS

These and other objects and features of the invention are provided by a method for regasification of liquid natural gas (LNG) aboard a floating carrier vessel before the LNG is offloaded as a gas, said method comprising:

boosting the LNG pressure and flowing said LNG into an LNG/coolant heat exchanger in which the LNG is evaporated;

flowing evaporated natural gas (NG) into an NG/steam heat exchanger, in which the NG is heated to before it is transferred to shore as superheated vapor;

wherein the LNG in said LNG/coolant heat exchanger is evaporated by thermal exchange against a coolant entering said heat exchanger as a gas and leaving said heat exchanger in a liquefied state;

said method comprising flowing said coolant in a closed circuit and through at least one coolant/seawater heat exchanger in which the liquefied coolant is evaporated before entering the LNG/coolant heat exchanger.

The invented method for regasification of liquid natural gas (LNG) aboard a floating carrier vessel before the LNG is offloaded as a gas, comprises:

boosting the LNG pressure and flowing said LNG into an LNG/coolant heat exchanger in which the LNG is evaporated;

flowing evaporated natural gas (NG) into an NG/steam heat exchanger, in which the NG is heated to before it is transferred to shore as superheated vapor;

wherein the LNG in said LNG/coolant heat exchanger is evaporated by thermal exchange against a coolant entering said heat exchanger as a gas and leaving said heat exchanger in a liquefied state;

said method further comprising flowing said coolant in a closed circuit and through at least one coolant/seawater heat exchanger in which the liquefied coolant is evaporated before entering the LNG/coolant heat exchanger.

Certain embodiments of the invented method are defined in the dependent claims 2 to 10.

The invented method is accomplished by a novel liquid natural gas (LNG) regasification system for installation aboard a floating carrier vessel, said system comprising:

an LNG/coolant heat exchanger for evaporation of the LNG;

a booster pump for boosting the pressure in the LNG prior to entering the LNG/coolant heat exchanger;

a natural gas (NG)/steam heat exchanger for heating the NG before it is transferred to shore as superheated vapor;

a closed circuit comprising at least one coolant/seawater heat exchanger for evaporation of the liquefied coolant before said coolant is flowed into the LNG/coolant heat exchanger.

Certain embodiments of the invented system are defined in the dependent claims 12 to 20.

BRIEF DESCRIPTION OF THE DRAWINGS

An embodiment of the present invention will now be described in further detail, in order to exemplify its principles, operation and advantages. The description refers to the following drawings, not necessarily to scale, where like parts have been given like reference numerals.

DETAILED DESCRIPTION OF CERTAIN EMBODIMENTS OF THE INVENTION

Figure 1:
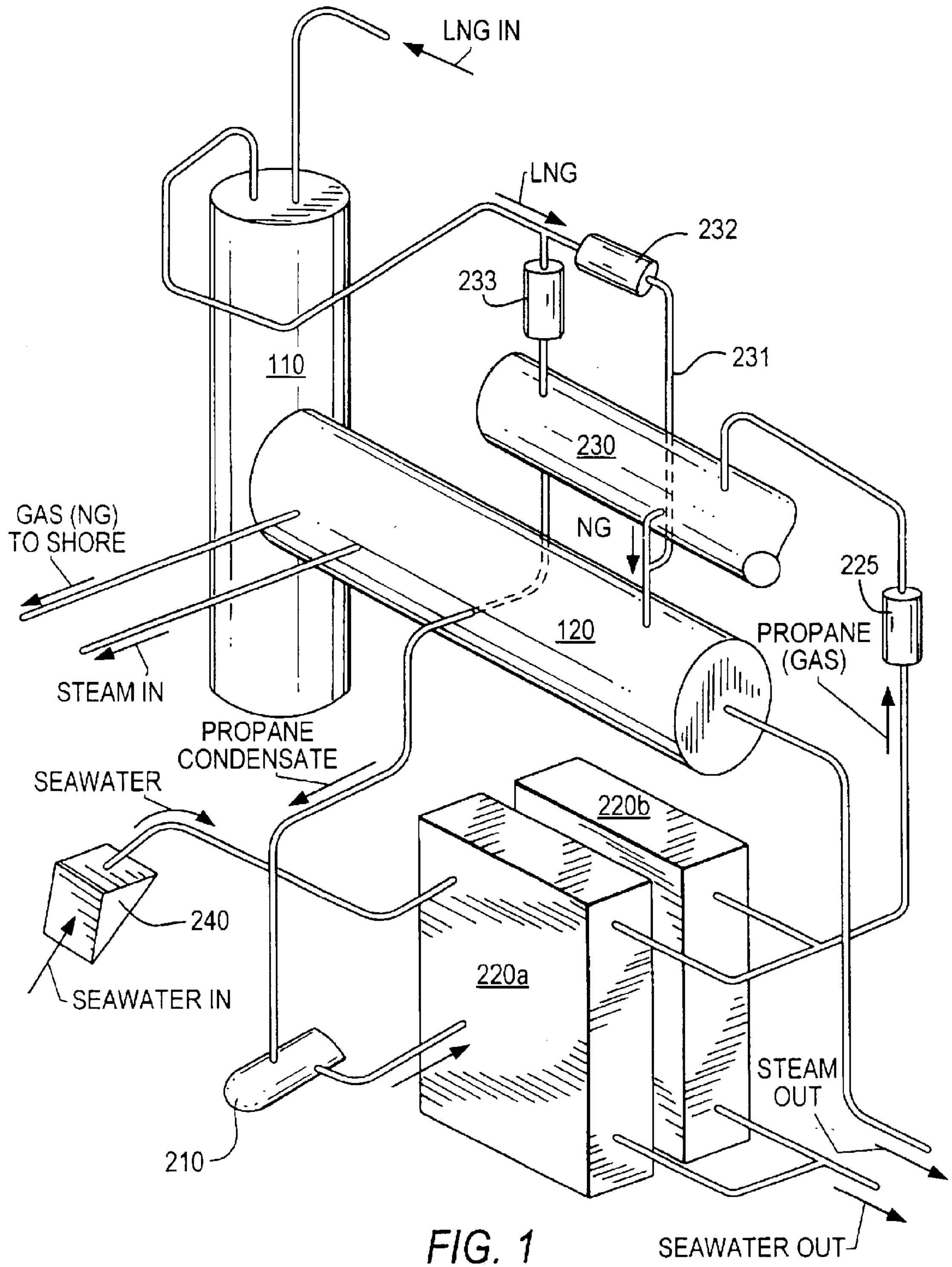
FIG. 1 is an exemplary perspective view of an LNG regasification system incorporating an embodiment of the present invention.
Figure 2:
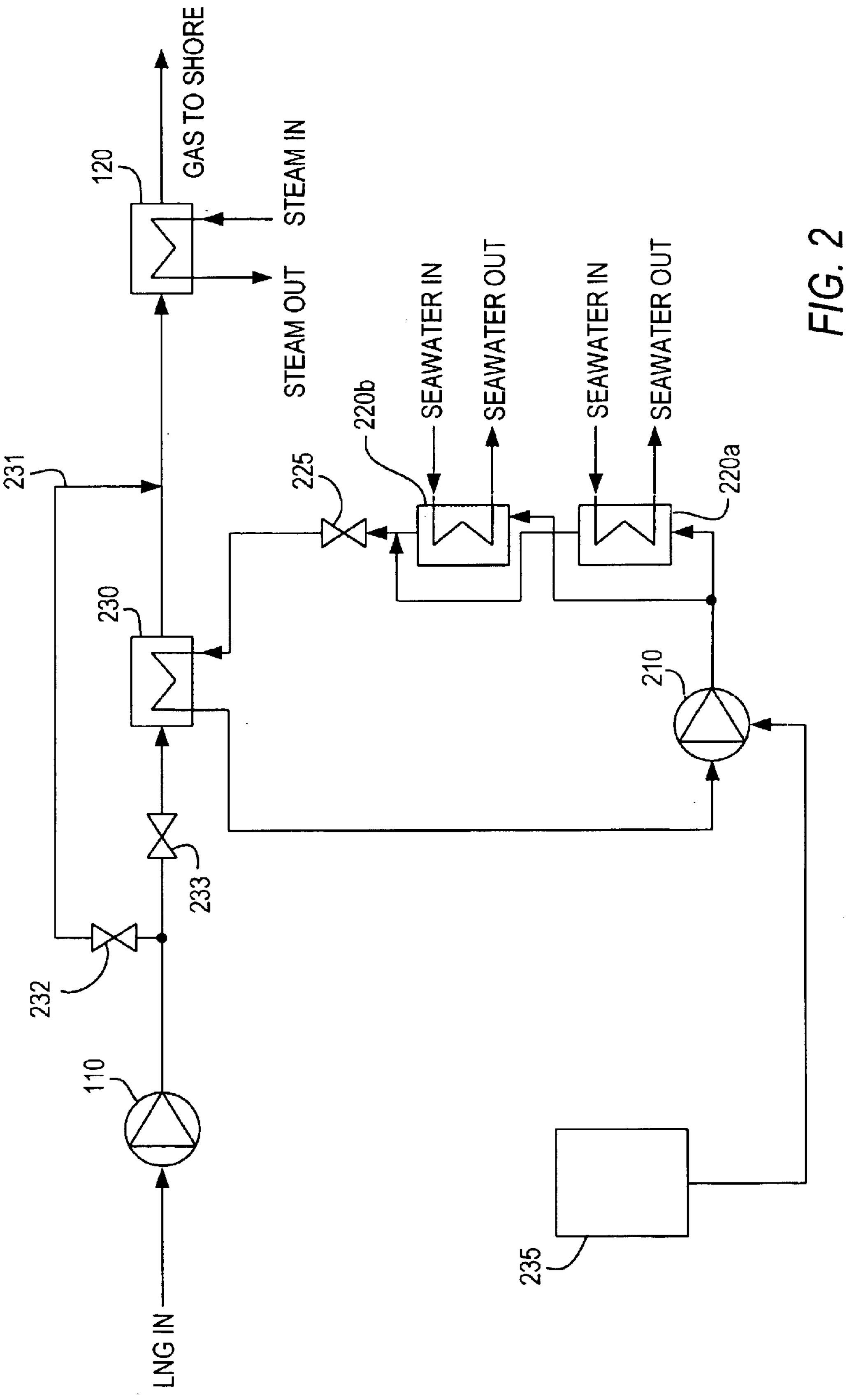
FIG. 2 is a simplified schematic flow diagram of the regasification system of the present invention.

An embodiment of the regasification system according to the present invention will now be described in detail. The regasification system comprises basically two circuits: a coolant circuit and a natural gas circuit. Propane is often preferred as a coolant, but any fluid having an evaporation temperature of about 0° C. in the pressure ranges 2 to 25 bar may be suitable.

As shown in the figures, the LNG (e.g. methane) is fed from the onboard tanks (not shown) and into a cryogenic booster pump 110 which boosts the LNG pressure, and from which it is flowed into an LNG/coolant heat exchanger 230. Typically—for liquefied methane—the temperature upon entering the LNG/coolant heat exchanger is in the order of −160° C. at a pressure of about 50 to 130 bar. The LNG/coolant heat exchanger 230 may be a stainless steel type compact printed circuit heat exchanger (PCHE).

The natural gas (NG) leaves the LNG/coolant heat exchanger 230 in an evaporated state (for methane, at a temperature in the range of about −50 to −10° C.), and enters an NG/steam heat exchanger 120, where the NG is heated before it is conveyed to shore as superheated vapor. In the case of methane, the vapor temperature is about 0° C.

The coolant circuit is selectively fed from a coolant supply 235, and driven by a pump 210 though at least one coolant/seawater heat exchanger 220*a,b* before it is fed into the LNG/coolant heat exchanger 230. In the heat exchange with the LNG, the coolant condenses and flows back to the coolant pump before it again is sent into the coolant/seawater heat exchanger(s) where it is evaporated.

The invented regasification system is thus based upon the coolant (e.g. propane) undergoing a phase change in the LNG/coolant heat exchanger 230 (condensing) and in the coolant/seawater heat exchanger 220*a,b* (evaporating). The coolant is at a higher temperature while heat exchanging with seawater. Unlike other regasification systems, the invented system forces the coolant though the coolant circuit, and it is also possibly to control the pressure in the coolant by a valve 225, preferably positioned between the coolant/seawater heat exchanger(s) and the LNG/coolant heat exchanger 230. The temperature in the coolant condensate leaving the heat exchanger 230 is controllable by means of valves 232, 233 and a bypass line 231 on the LNG/coolant heat exchanger.

In one embodiment, the LNG regasification system may be installed on a Shuttle Regasification Vessel (SRV) or Floating Storage Regasification Units (FSRU). The regasification system and the heat exchangers are specially designed for marine installations and for cryogenic working conditions. The system is based upon proven equipment with extensive references.

Examples of heat exchangers suitable for the invented system, are designed for handling LNG with the following typical composition:

| Composition (Mole %) | Standard liquid |
|---|---|
| Nitrogen | 0.34% |
| Methane (C1) | 89.50% |
| Ethane (C2) | 6.33% |
| Propane (C3) | 2.49% |
| Butane (C4) | 1.26% |
| Pentane (C5) | 0.08% |
| Hexane (C6) | 0.0% |

In one embodiment, basic data input data may be:

| | |
|---|---|
| LNG-Flow | 200000 kg/hr |
| LNG inlet temperature | −160° C. |
| Gas outlet temperature | 0° C. |
| LNG inlet pressure | max 130 bar |
| LNG outlet pressure | 2–6 bar below inlet pressure |
| Inlet seawater temp. | 14° C. |

The coolant/seawater heat exchanger(s) 220*a,b* to heat the coolant (e.g. propane) against seawater are preferably plate heat exchangers or PCHE instead of shell and tube type heat exchangers.

In the described embodiment;

the LNG/coolant heat exchanger 230 is an LNG/propane heat exchanger type stainless steel compact Printed Circuit Heat Exchanger (PCHE);

The coolant/seawater heat exchanger(s) 220*a,b* are propane/seawater semi-welded plate heat exchangers in titanium, or PCHE or All Welded Plate heat exchanger;

The NG/steam heat exchanger 120 is an NG/seawater shell and tube heat exchanger type; e.g. HamworthyKSE 305/424/120.3/2U Titanium.

The LNG pump 110 is a cryogenic pump rated at 120 barg and 450 $m^3$/hr;

The coolant pump 210 is a propane pump rated at 560 $m^3$/hr and maximum 2,5 bar pressure difference.

Figure 3:
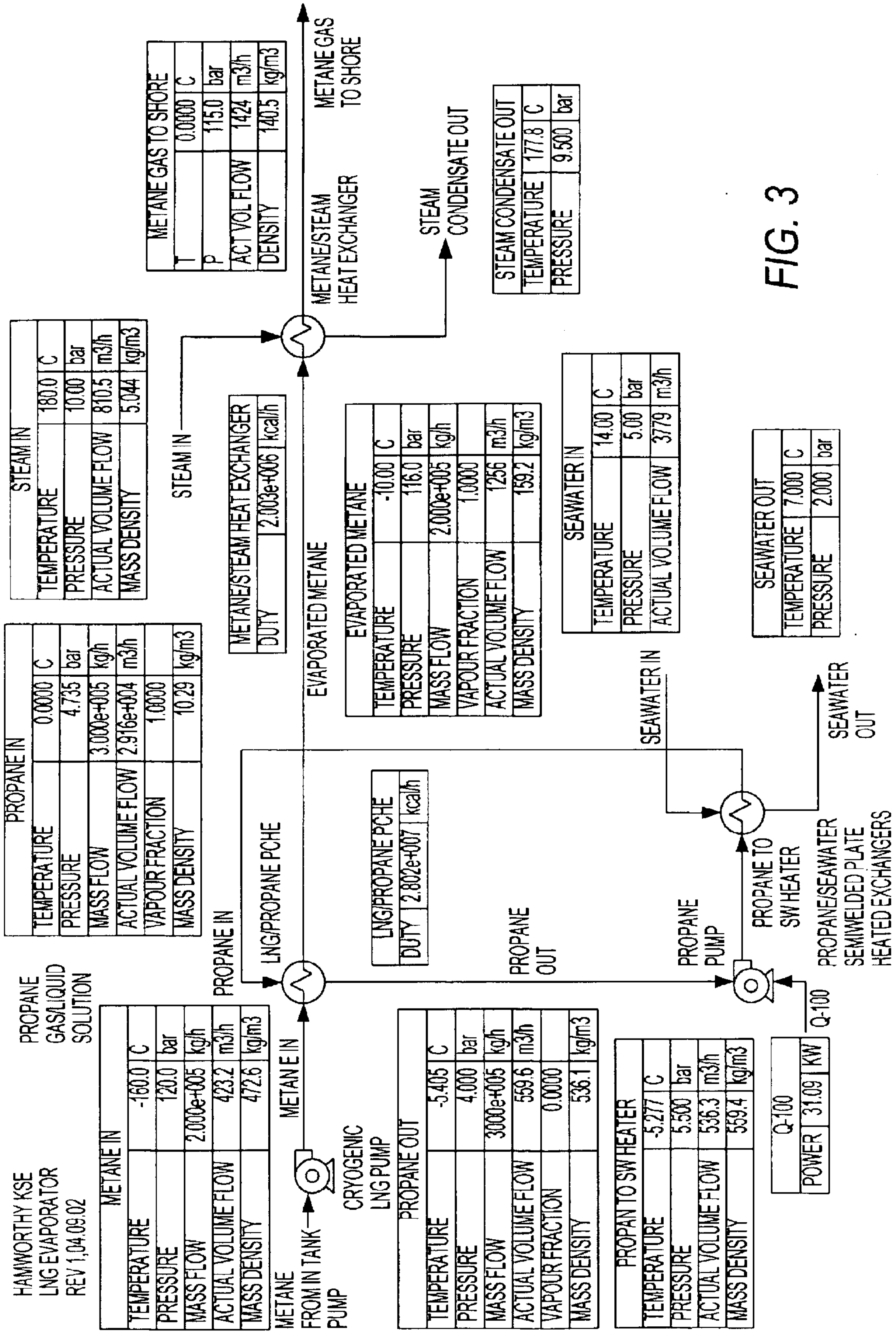
FIG. 3 is a simplified flow diagram of one embodiment of the present invention.
Figure 4:
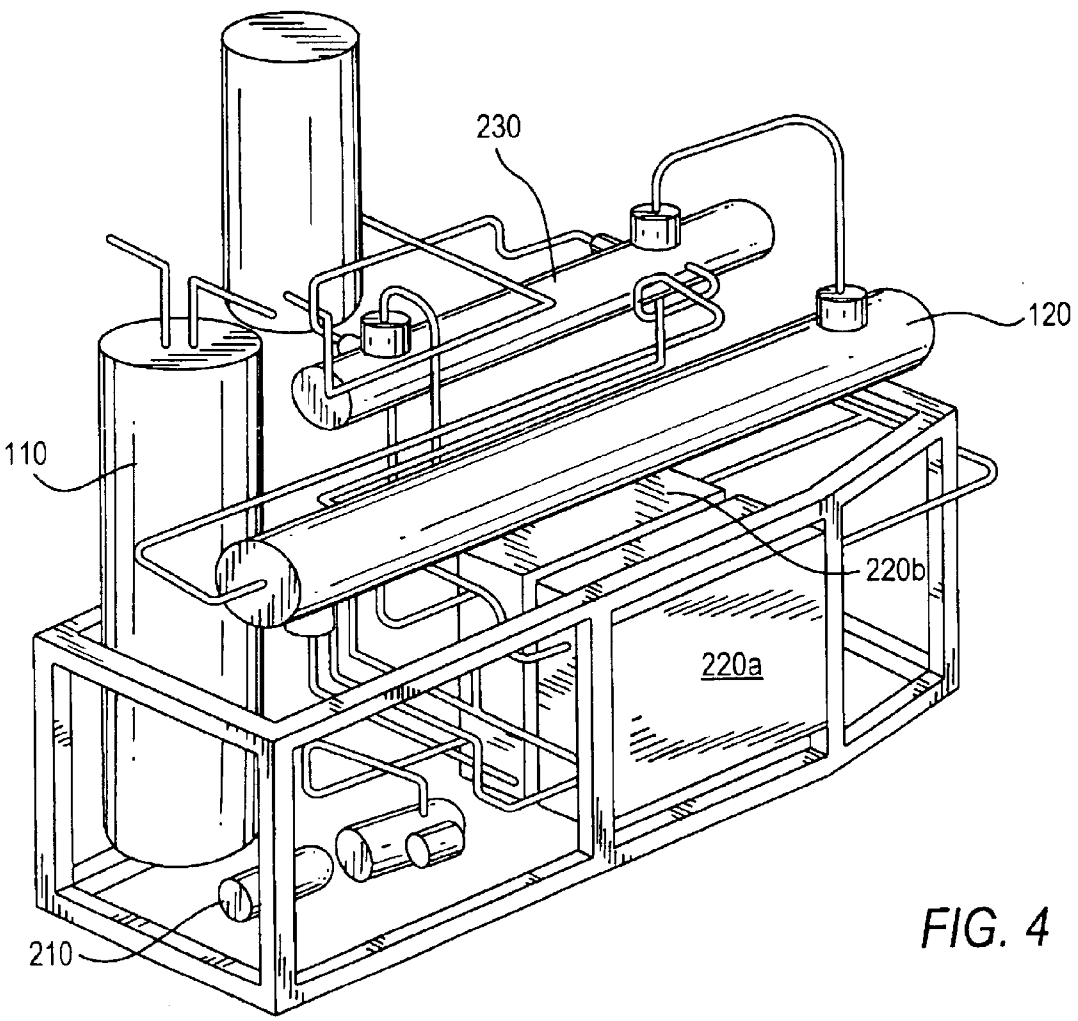
FIG. 4 is an isometric view of one embodiment of the present invention.

Referring to FIG. 3, showing a simplified flow diagram of one embodiment of the invention, LNG at maximum 130 bar and a temperature of −160° C. enters the LNG/Propane PCHE heat exchanger. It leaves with a temperature of −50 to −10° C. and enters the LNG/steam shell and tube type heat exchanger where it leaves as superheated vapor (5) with a temperature of approximately 0° C.

In the LNG/Propane PCHE heat is exchanged against propane circulating in a closed loop. The propane enters the PCHE at approx 0° C. at 4,7 bar as gas. In the PCHE the propane is condensated, and leaves the PCHE as liquid at −5° C. This temperature is controlled with valves 232, 233 and a bypass line 231 on LNG stream to PCHE. The propane in the closed loop is then pumped by the circulating pump and heated against seawater in 2 off plate heat exchangers, semi-welded type in Titanium. In these heat exchangers, the propane is evaporated at about 0° C. before it returns as gas to the PCHE.

Compared with the prior art, semi-welded plate heat exchangers are used between the propane and seawater and a smaller propane circulating pump (only one) may be used.

In semi-welded plate heat exchangers (or PCHE or all welded), propane will be evaporated at about 0° C. The heat exchanger is similar to standard gasketed plate heat exchangers, but every second channel is welded. This makes it capable of handling aggressive medias like propane, and it still has the benefit of easy access for cleaning on the seawater side.

One suitable type of semi-welded plate heat exchanger is:

Make: Alfa Laval

Materials: Titanium

Design pressure: 16 barg

Design temperature: −20° C. to 50° C.

Dimension (approx.): L: 4, m, H: 3,2 m W: 1,2 m

The foregoing description and the embodiments of the present invention are to be construed as mere illustrations of the application of the principles of the invention. The foregoing is not intended to limit the scope of the claims, but the true spirit and scope of present invention is defined by the claims.

What is claimed is:

1. A method for regasification of liquid natural gas (LNG) aboard a floating carrier vessel before the LNG is offloaded as a gas, said method comprising:

boosting the LNG pressure and flowing said LNG into an LNG/coolant heat exchanger (230) in which the LNG is evaporated;

flowing evaporated natural gas (NG) into an NG/steam heat exchanger (120), in which the NG is heated before the NG is transferred to shore as superheated vapor;

evaporating the LNG in said LNG/coolant heat exchanger (230) by thermal exchange against a coolant entering said heat exchanger as a gas and leaving said heat exchanger in a liquefied state; and flowing said coolant in a closed coolant circuit including a valve (225), and through at least one coolant/seawater heat exchanger (220*a*, 220*b*) in which the liquefied coolant is evaporated before entering the LNG/coolant heat exchanger, and wherein the pressure in the evaporated coolant is controlled by the valve (225).

2. A method for regasification of liquid natural gas (LNG) aboard a floating carrier vessel before the LNG is offloaded as a natural gas, said method comprising:

boosting the LNG pressure and flowing said LNG into an LNG/coolant heat exchanger (230) in which the LNG is evaporated;

flowing evaporated natural gas (NG) into an NG/steam heat exchanger (120), in which the NG is heated before the NG is transferred to shore as superheated vapor;

evaporating the LNG in said LNG coolant heat exchanger (23O) by thermal exchange against a coolant entering said heat exchanger as a gas and leaving said heat exchanger in a liquefied state; and flowing said coolant in a closed coolant circuit and through at least one coolant/seawater heat exchanger (220*a*, 220*b*) in which the liquefied coolant is evaporated before entering the LNG/coolant heat exchanged wherein the pressure in the evaporated coolant is controlled by a valve (225) and wherein said coolant temperature is controlled by means of a bypass (231, 232, 233) on said LNG/coolant heat exchanger.

3. The method of claim 1, wherein the number of at least one coolant/seawater heat exchangers is two.

4. The method of claim 1, wherein the coolant is propane.

5. The method of claim 1, wherein the coolant is a medium having a boiling temperature of 0° C. at any pressures between 2 bar and 25 bar.

6. The method of claim 1, wherein the LNG/coolant heat exchanger is a stainless steel compact printed circuit heat exchanger (PCHE).

7. The method of claim 1, wherein the NG/steam heat exchanger is an SS316 shell and tube heat exchanger.

8. The method or claim 1, wherein the at least one coolant/seawater heat exchanger is at least one titanium plate heat exchanger.

9. The method of claim 1, wherein the coolant is flowed through said circuit by a pumping means (210).

10. A liquid natural gas (LNG) regasification system for installation aboard a floating carrier vessel, said system comprising:

an LNG/coolant heat exchanger (230) for evaporation of the LNG;

a booster pump (110) for boosting the pressure in the LNG prior to entering the LNG/coolant heat exchanger (230);

a natural gas (NG)/steam heat exchanger (120) for heating the NG before the NG is transferred to shore as superheated vapor; and at least one closed coolant circuit comprising at least one coolant/seawater heat exchanger (220*a*, 220*b*) for evaporation of the liquefied coolant before said coolant is flowed into the LNG/coolant heat exchanger (230), said closed coolant circuit further comprising a valve (225) for controlling the pressure in the evaporated coolant, whereby the coolant evaporation temperature may be controlled.

11. The regasification system of claim 10, wherein the at least one coolant circuit comprises at least two coolant/seawater heat exchangers (220*a*, 220*b*).

12. The regasification system of claim 10, wherein said coolant temperature is controlled by means of a bypass (231, 232, 233) on said LNG/coolant heat exchanger.

13. The regasification system of claim 10, wherein the coolant is propane.

14. The regasification system of claim 10, wherein the coolant is a medium having a boiling temperature of 0° C. at any pressures between 2 bar and 25 bar.

15. The regasification system of claim 10, wherein the LNG/coolant heat exchanger is a stainless steel compact printed circuit heat exchanger (PCHE).

16. The regasification system of claim 10, wherein the NG/steam heat exchanger is an SS316 shell an tube heat exchanger.

17. The regasification system of claim 10, wherein the at least one coolant/seawater heat exchanger is at least one titanium plate heat exchanger.

18. The regasification system of claim 10, wherein the coolant is flowed through said circuit by a pumping means (210).

19. A method for regasification of liquid natural gas (LNG) aboard a floating carrier vessel before the LNG is offloaded as a gas, the method comprising:

boosting the LNG pressure and flowing the LNG into an LNG/coolant heat exchanger in which the LNG is evaporated;

flowing evaporated natural gas (NG) into an NG/steam heat exchanger, in which the NG is heated before the NG is transferred to shore as superheated vapor;

evaporating the LNG in the LNG/coolant heat exchanger by thermal exchange against a coolant entering the heat exchanger as gas and leaving the heat exchange in a liquefied state; and flowing the coolant in a closed coolant circuit and through at least one coolant/seawater heat exchanger in which the liquefied coolant is evaporated before entering the LNG/coolant heat exchanger, wherein the coolant circuit comprises a valve for controlling the pressure in the evaporated coolant.

20. A method for regasification of liquid natural gas (LNG) aboard a floating carrier vessel before the LNG is offloaded as a gas, the method comprising:

boosting the LNG pressure and flowing the LNG into an LNG/coolant heat exchanger in which the LNG is evaporated;

flowing evaporated natural gas (NG) into an NG/steam heat exchanger, in which the NG is heated before the NG is transferred to shore as superheated vapor;

evaporating the LNG in the LNG/coolant heat exchanger by thermal exchange against a coolant entering the heat exchanger as gas and leaving the heat exchanger in a liquefied state;

flowing the coolant in a closed coolant circuit and through at least one coolant/seawater heat exchanger in which the liquefied coolant is evaporated before entering the LNG/coolant heat exchanger; and controlling the coolant temperature by means of a bypass on the LNG/coolant heat exchanger.

21. A liquid natural gas (LNG) regasification system for installation aboard a floating carrier vessel, the system comprising:

an LNG/coolant heat exchanger for evaporation of the LNG;

a booster pump for boosting the pressure in the LNG prior to entering the LNG/coolant heat exchanger;

a natural gas (NG)/steam heat exchanger for heating the NG before the NG is transferred to shore as superheated vapor; and a closed coolant circuit including:

at least one coolant/seawater heat exchanger for evaporation of the liquefied coolant before the coolant is flowed into the LNG/coolant heat exchanger; and a valve for controlling the pressure in the evaporated coolant, whereby the coolant evaporation temperature may be controlled.

22. A liquid natural gas (LNG) regasification system for installation aboard a floating carrier vessel, the system comprising:

an LNG/coolant heat exchanger, including a bypass, for evaporation of the LNG;

a booster pump for boosting the pressure in the LNG prior to entering the LNG/coolant heat exchanger;

a natural gas (NG)/steam heat exchanger for heating the NG before the NG is transferred to shore as superheated vapor; and a closed coolant circuit comprising at least one coolant/seawater heat exchanger for evaporation of the liquefied coolant before the coolant is flowed into the LNG/coolant heat exchanger;

wherein the coolant temperature is controlled by means of the bypass on the LNG/coolant heat exchanger.

* * * * *